United States Patent
Zhong et al.

(10) Patent No.: US 10,488,672 B2
(45) Date of Patent: Nov. 26, 2019

(54) STEREOSCOPIC DISPLAY COMPONENT, LIQUID CRYSTAL PANEL AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Quanmin Zhong, Beijing (CN); Xinghua Li, Beijing (CN); Wei He, Beijing (CN); Jing Wang, Beijing (CN); Zhiyong Yang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 616 days.

(21) Appl. No.: 14/422,799

(22) PCT Filed: Mar. 20, 2014

(86) PCT No.: PCT/CN2014/073788
§ 371 (c)(1),
(2) Date: Feb. 20, 2015

(87) PCT Pub. No.: WO2015/120649
PCT Pub. Date: Aug. 20, 2015

(65) Prior Publication Data
US 2015/0346498 A1    Dec. 3, 2015

(30) Foreign Application Priority Data

Feb. 14, 2014  (CN) .......................... 2014 1 0052383

(51) Int. Cl.
*G02B 27/22*    (2018.01)
*G02F 1/1335*   (2006.01)
(Continued)

(52) U.S. Cl.
CPC ............. *G02B 27/22* (2013.01); *G02B 27/26* (2013.01); *G02F 1/1336* (2013.01);
(Continued)

(58) Field of Classification Search
USPC ................................ 349/15, 65, 96, 149–152
See application file for complete search history.

(56) References Cited

U.S. PATENT DOCUMENTS 5,392,140 A    2/1995  Ezra et al.
5,822,117 A *  10/1998 Kleinberger ....... G02B 27/2207
                                                       359/465
(Continued)

FOREIGN PATENT DOCUMENTS

CN    201063782 Y    5/2008
CN    101339307 A    1/2009
(Continued)

OTHER PUBLICATIONS

Birendra Bahadur, Liquid Crystals Applications and Uses, 1990, World Scientific, vol. 1, pp. 171-194.*
(Continued)

*Primary Examiner* — Edward J Glick
*Assistant Examiner* — David Y Chung
(74) *Attorney, Agent, or Firm* — Nath, Goldberg & Meyer; Joshua B. Goldberg (57) ABSTRACT

The present invention provides a stereoscopic display component, a liquid crystal panel and a display device. The stereoscopic display component includes a backlight board and a grating array, wherein the backlight board includes a plurality of backlight sets, each backlight set includes a (Continued)

plurality of backlight strips capable of emitting light independently, the grating array includes a plurality of grating sets in one-to-one correspondence with the plurality of backlight sets, each grating set includes a plurality of gratings in one-to-one correspondence with the plurality of backlight strips in each backlight set, and each grating can be used for guiding light emitted from the backlight strip corresponding to the grating to two preset viewpoints. The present invention further provides a liquid crystal panel and a display device. The display device provided by the present invention has relatively high visual resolution.

9 Claims, 6 Drawing Sheets (51) Int. Cl.
    *G02F 1/13357* (2006.01)
    *G02F 1/1337* (2006.01)
    *G02B 27/26* (2006.01)
    *H04N 13/305* (2018.01)
    *H04N 13/312* (2018.01)
    *H04N 13/31* (2018.01)
    *H04N 13/354* (2018.01)
    *H04N 13/32* (2018.01)

(52) U.S. Cl.
    CPC ...... *G02F 1/1337* (2013.01); *G02F 1/133528* (2013.01); *H04N 13/305* (2018.05); *H04N 13/31* (2018.05); *H04N 13/312* (2018.05); *H04N 13/354* (2018.05); *G02F 2001/133607* (2013.01); *H04N 13/32* (2018.05)

(56) References Cited

U.S. PATENT DOCUMENTS

| | | | |
|---|---|---|---|
| 5,969,850 | A | 10/1999 | Harrold et al. |
| 7,940,342 | B2* | 5/2011 | Lee .................. G02B 27/26 349/117 |
| 2006/0050197 | A1* | 3/2006 | Hu .................. G02B 6/005 349/61 |
| 2006/0221443 | A1* | 10/2006 | Cha .................. G02B 27/2214 359/465 |
| 2010/0073604 | A1* | 3/2010 | Okuyama ........ B29D 11/00644 349/75 |
| 2011/0090419 | A1* | 4/2011 | Yokoyama ......... G02B 27/2214 349/57 |
| 2012/0307181 | A1* | 12/2012 | Fang ................ G02F 1/133606 349/64 |
| 2013/0155503 | A1* | 6/2013 | Yen .................. H04N 13/0404 359/463 |
| 2015/0301400 | A1* | 10/2015 | Kimura ............. G02F 1/133512 349/43 |

FOREIGN PATENT DOCUMENTS

| | | |
|---|---|---|
| CN | 102183840 A | 9/2011 |
| CN | 102809088 A | 12/2012 |
| CN | 102902099 A | 1/2013 |
| CN | 202693913 U | 1/2013 |
| CN | 103163682 A | 6/2013 |
| CN | 103293686 A | 9/2013 |
| CN | 203838417 U | 9/2014 |
| JP | 2003057442 A | 2/2003 |
| JP | 2007011313 A | 1/2007 |
| JP | 2012133024 A | 7/2012 |
| JP | 2012252937 A | 12/2012 |

OTHER PUBLICATIONS

Notification of the First Office Action dated Jul. 1, 2015 corresponding to Chinese application No. 201410052383.7.
Written Opinion of the International Searching Authority dated Nov. 19, 2014 corresponding to International application No. PCT/CN2014/073788.
International Patent Application No. PCT/CN2014/073788, International Search Report dated Nov. 19, 2014, thirteen (13) pages.

* cited by examiner

STEREOSCOPIC DISPLAY COMPONENT, LIQUID CRYSTAL PANEL AND DISPLAY DEVICE

This is a National Phase Application filed under 35 U.S.C. 371 as a national stage of PCT/CN2014/073788, filed Mar. 20, 2014, and claims priority benefit from Chinese Application No. 201410052383.7, filed Feb. 14, 2014, the content of each of which is hereby incorporated by reference in its entirety.

FIELD OF THE INVENTION

The present invention relates to the field of stereoscopic display, and particularly, to a stereoscopic display component, a liquid crystal panel and a display device including the stereoscopic display component and the liquid crystal panel.

BACKGROUND OF THE INVENTION

Usually, a display device used for realizing naked eye stereoscopic display includes a liquid crystal panel and a grating array arranged at one side of the liquid crystal panel. One image displayed in the liquid crystal panel is divided into a plurality of disparity images, to enable the left and right eyes of a viewer to see different viewpoints within a certain distance range due to the splitting effect of gratings in the grating array so as to obtain stereo perception.

However, since the same image is divided into a plurality of disparity images, and the left eye and the right eye of the viewer can see respective disparity images, resulting in resolution reduction during stereoscopic display.

Therefore, how to prevent the resolution reduction during stereoscopic display becomes a technical problem to be urgently solved in the field.

SUMMARY OF THE INVENTION

An object of the present invention is to provide a stereoscopic display component, a liquid crystal panel and a display device including the stereoscopic display component and the liquid crystal panel. The display device can be used for reducing resolution loss during stereoscopic display.

To fulfill the above-mentioned object, as one aspect of the present invention, a stereoscopic display component is provided, and the stereoscopic display component includes a backlight board and a grating array, wherein the backlight board includes a plurality of backlight sets, each backlight set includes a plurality of backlight strips capable of emitting light independently, the grating array includes a plurality of grating sets in one-to-one correspondence with the plurality of backlight sets, each grating set includes a plurality of gratings in one-to-one correspondence with the plurality of backlight strips in a corresponding backlight set, and each grating can be used for guiding light emitted from a backlight strip corresponding to the grating to two preset viewpoints.

For example, the grating includes a first polarization strip and a second polarization strip, which are arranged adjacently, and a polarization direction of the first polarization strip is vertical to a polarization direction of the second polarization strip.

For example, a width of each grating meets the following condition:

$$W_{s1} = \frac{et}{2(e-t)},$$

wherein $W_{s1}$ refers to the width of each grating, e refers to the distance between two eyes, and t refers to a pixel pitch of the liquid crystal panel of the stereoscopic display component.

For example, the number of the backlight strips included in each backlight set is the same as the number of the plurality of disparity images that an image to be displayed stereoscopically is divided into.

For example, the number of the backlight strips included in each backlight set is 4-6.

For example, the light emission frequency of each backlight strip is 50×N Hz to 70×N Hz, wherein N refers to the number of the backlight strips included in each backlight set.

For example, the grating is a slit grating or a cylindrical lens grating.

As another aspect of the present invention, a liquid crystal panel is provided, and the liquid crystal panel includes a plurality of columns of pixel groups used for forming a plurality of disparity images, each column of pixel groups including a plurality of columns of pixels, each column of pixels including a plurality of pixels, and the number of columns of the pixels in each column of pixel groups being equal to the number of the plurality of disparity images, wherein the plurality of columns of pixel groups are in one-to-one correspondence with the plurality of backlight sets of the above-mentioned stereoscopic display component provided by the present invention, and in each column of pixel groups, the plurality of columns of pixels are in one-to-one correspondence with the plurality of backlight strips in a corresponding backlight set.

For example, the liquid crystal panel includes an array substrate, a polarizer array arranged on the array substrate, a cell alignment substrate and a liquid crystal layer arranged between the array substrate and the cell alignment substrate, wherein the polarizer array includes a plurality of polarizers in one-to-one correspondence with the plurality of columns of pixels, each polarizer includes a third polarization strip and a fourth polarization strip, which are arranged adjacently, a polarization direction of the third polarization strip is vertical to a polarization direction of the fourth polarization strip, a pixel electrode of each pixel of the liquid crystal panel includes a first pixel electrode strip and a second pixel electrode strip, the first pixel electrode strip corresponds to the third polarization strip, and the second pixel electrode strip corresponds to the fourth polarization strip.

For example, a width of each polarization strip meets the following condition:

$$W_{s2} = \frac{t}{2},$$

wherein $W_{s2}$ refers to the width of each polarization strip, and t refers to a pixel pitch of the liquid crystal panel.

As still another aspect of the present invention, a display device is provided, and the display device includes a stereoscopic display component, a liquid crystal panel and a drive circuit, wherein the stereoscopic display component is the above-mentioned stereoscopic display component provided by the present invention, the liquid crystal panel is the above-mentioned liquid crystal panel provided by the present invention, the drive circuit is electrically connected with the liquid crystal panel, and when a backlight strip in a backlight set emits light, the drive circuit provides drive signals to a corresponding column of pixels.

For example, the grating includes a first polarization strip and a second polarization strip, which are arranged adjacently, the polarization direction of the first polarization strip is vertical to the polarization direction of the second polarization strip, the grating array is arranged between the liquid crystal panel and the backlight board, the liquid crystal panel includes an array substrate, a polarizer array arranged on the array substrate, a cell alignment substrate and a liquid crystal layer arranged between the array substrate and the cell alignment substrate, the polarizer array includes a plurality of polarizers, each polarizer includes a third polarization strip and a fourth polarization strip, which are arranged adjacently, the polarization direction of the third polarization strip is vertical to the polarization direction of the fourth polarization strip, the polarization direction of the first polarization strip is the same as the polarization direction of the third polarization strip, and the polarization direction of the second polarization strip is the same as the polarization direction of the fourth polarization strip.

For example, the width of each grating meets the following condition:

$$W_{s1} = \frac{et}{2(e-t)},$$

wherein $W_{s1}$ refers to the width of each grating, e refers to the distance between two eyes and is 50-75 mm, and t refers to the pixel pitch of the liquid crystal panel;

the width of each polarization strip of each polarizer meets the following condition:

$$W_{s2} = \frac{t}{2},$$

wherein $W_{s2}$ refers to the width of each polarization strip.

For example, the distance between the grating array and the polarizer array is:

$$D = \frac{Lt}{e-t},$$

wherein D refers to the distance between the grating array and the polarizer array, and L refers to a preset optimal viewing distance.

For example, the number of the backlight strips included in each backlight set is the same as the number, of the plurality of disparity images that an image to be displayed stereoscopically is divided into.

For example, the number of the backlight strips included in each backlight set is 4-6.

For example, the light emission frequency of each backlight strip is 50×N Hz to 70×N Hz, wherein N refers to the number of the backlight strips included in each backlight set, and the frequency at which the drive circuit provides the drive signals to each column of pixels of each column of pixel groups is consistent with the light emission frequency of the corresponding backlight strip in the corresponding backlight set.

For example, the drive circuit is electrically connected with the backlight board for providing light emission signals to the plurality of backlight strips of the backlight board, and the light emission signals to the plurality of backlight strips are synchronized with the drive signals of a plurality of columns of pixels in one-to-one correspondence with the plurality of backlight strips.

For example, when the grating is a slit grating, the grating array is arranged between the liquid crystal panel and the backlight board.

For example, when the grating is a cylindrical lens grating, the grating array is arranged at the light outgoing side of the liquid crystal panel.

When one backlight strip emits light, the light from the one backlight strip is guided by a corresponding grating to two preset viewpoints, and when another backlight strip emits light, the light emitted from the another backlight strip is guided by a corresponding grating to the two above-mentioned preset viewpoints. It can be seen that, when being respectively located at the two preset viewpoints, the left eye and the right eye of the viewer can respectively receive a plurality of disparity images (the number of the disparity images is equal to that of the backlight strips in each backlight set). If the occurrence frequency of the plurality of disparity images is high enough (i.e., when the residual image of one image has not disappeared from the brain of the viewer, another image has been displayed already), and a sense of the plurality of disparity images overlapping together will occur in the brain of the viewer, thus being equivalent to increasing the visual resolution of the viewer.

BRIEF DESCRIPTION OF THE DRAWINGS

Accompanying drawings are used for providing further understanding of the present invention, constitute a part of the description, and are used for explaining the present invention together with the following embodiments rather than limiting the present invention. In the accompanying drawings.

REFERENCE NUMERALS

100: backlight board
110: backlight set
111, 112, 113, 115, 116: backlight strip
200: grating array
210: grating set
211, 212, 213, 214, 215, 216: grating
211a, 212a, 213a, 214a, 215a, 216a: first polarization strip
211b, 212b, 213b, 214b, 215b, 216b: second polarization strip
300: liquid crystal panel 310: polarizer array
311, 312, 313, 314, 315, 316: polarizer
311a, 312a, 313a, 314a, 315a, 316a: third polarization strip
311b, 312b, 313b, 314b, 315b, 316b: fourth polarization strip
320: common electrode
330: optical filter
340: array substrate
350: cell alignment substrate
360: liquid crystal layer
370: analyser
381, 382, 383, 384, 385, 386: pixel electrode
381a: first pixel electrode strip
381b: second pixel electrode strip

DETAILED DESCRIPTION OF THE EMBODIMENTS

The present invention will be illustrated in detail below in conjunction with accompanying drawings. It should be understood that, the embodiments described herein are merely used for illustrating and explaining the present invention, rather than limiting the present invention.

Figure 1:
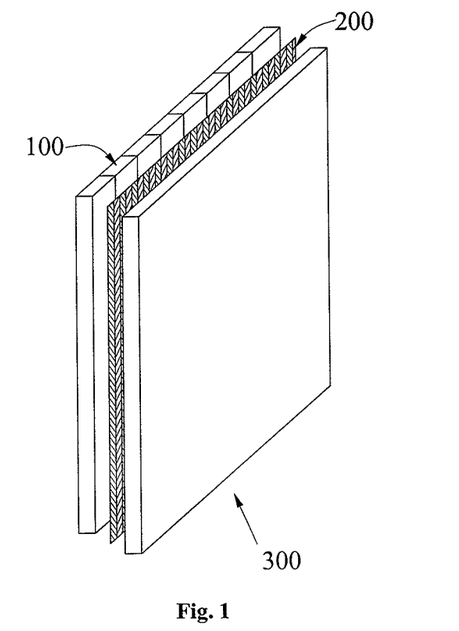
FIG. 1 is a perspective schematic diagram of a display device provided by the present invention.
Figure 2:
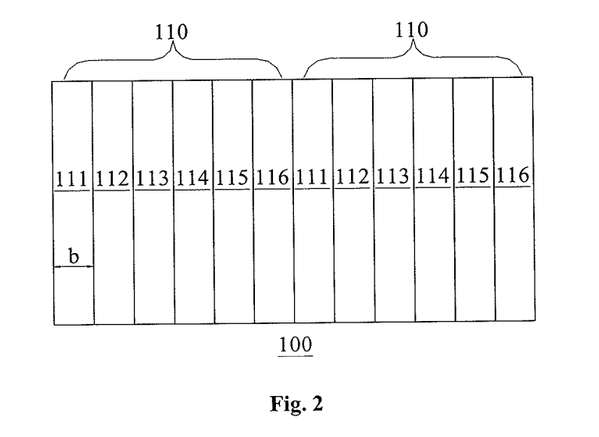
FIG. 2 is a schematic diagram of a backlight board in a stereoscopic display component provided by the present invention.

As shown in FIG. 1, as one aspect of the present invention, a stereoscopic display component is provided, and the stereoscopic display component includes a backlight board 100 and a grating array 200, wherein as shown in FIG. 2, the backlight board 100 includes a plurality of backlight sets 110 (only two groups are shown in FIG. 2), each backlight set 110 includes a plurality of backlight strips capable of emitting light independently (in the embodiment as shown in FIG. 2, each backlight set 110 includes 6 backlight strips, which are respectively a backlight strip 111, a backlight strip 112, a backlight strip 113, a backlight strip 114, a backlight strip 115 and a backlight strip 116).

Figure 3:
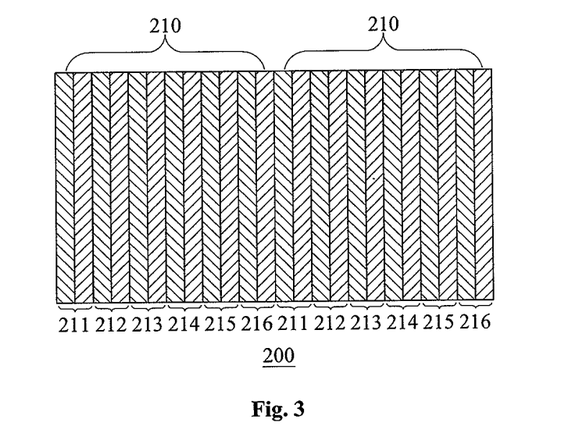
FIG. 3 is a schematic diagram of a grating array in the stereoscopic display component provided by the present invention.

It can be easily understood that, each backlight set includes the same number of backlight strips. Corresponding to the backlight board 100, as shown in FIG. 3, the grating array 200 includes a plurality of grating sets 210 in one-to-one correspondence with the plurality of backlight sets, each grating set 210 includes a plurality of gratings in one-to-one correspondence with the plurality of backlight strips in the corresponding backlight set (in the embodiment as shown in FIG. 3, each grating set 210 includes 6 gratings, which are respectively a grating 211 corresponding to the backlight strip 111, a grating 212 corresponding to the backlight strip 112, a grating 213 corresponding to the backlight strip 113, a grating 214 corresponding to the backlight strip 114, a grating 215 corresponding to the backlight strip 115 and a grating 216 corresponding to the backlight strip 116), and each grating can be used for guiding the light emitted by the backlight strip corresponding to the grating to two preset viewpoints.

It should be understood that, the two preset viewpoints herein form a group of viewpoints, and the two preset viewpoints are respectively a left eye viewpoint and a right eye viewpoint. Moreover, the preset viewpoints herein are optimal viewing points, namely, at a preset optimal viewing distance, only when the left eye of the viewer is located at one preset viewpoint and the right eye of the viewer is located at the other preset viewpoint, the viewer can respectively see two disparity images.

During propagation, the light from the backlight strips passes through the liquid crystal panel, such that an image displayed on the liquid crystal panel can be seen from the two preset viewpoints, and each viewpoint corresponds to one disparity image, thus a stereoscopic display effect can be achieved.

When one backlight strip emits light, the light from the one backlight strip is guided by the corresponding grating to two preset viewpoints, and when another backlight strip emits light, the light emitted by the another backlight strip is also guided by a corresponding grating to the two above-mentioned preset viewpoints. It can be seen that, when being respectively located at the two preset viewpoints, the left eye and the right eye of the viewer can respectively receive a plurality of disparity images (the number of the disparity images is equal to that of the backlight strips in each backlight set). If the occurrence frequency of the plurality of disparity images is high enough (i.e., when the residual image of one image has not disappeared from the brain of the viewer, another image has been displayed already), and a sense of the plurality of disparity images overlapping together will occur in the brain of the viewer, thus being equivalent to increasing the visual resolution of the viewer.

Figure 7:
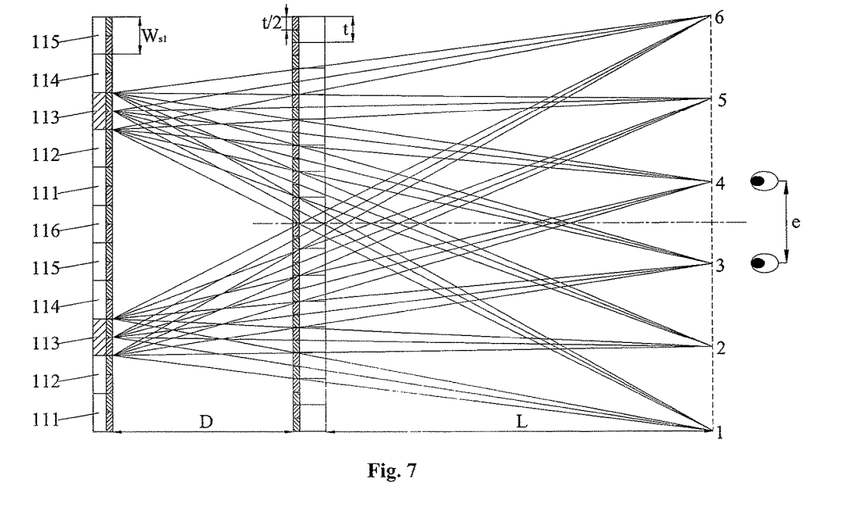
FIG. 7 is a principle diagram of the display device provided by the present invention for achieving no crosstalk display.

Within a space, it is not the case that only one group of optimal viewing points exists, but a plurality of groups of optimal viewing points may exist, and the number of the optimal viewing points and the number of the visual areas corresponding to the optimal viewing points are equal to the number of the disparity images of the corresponding liquid crystal panel. For example, as shown in FIG. 7, the two preset viewpoints are an optimal viewing point 3 and an optimal viewing point 4, meanwhile, an optimal viewing point 1, an optimal viewing point 2, an optimal viewing point 5 and an optimal viewing point 6 also exist in the space. Any two adjacent optimal viewing points can be the two preset viewpoints.

In the present invention, the specific form of the grating array 200 is not limited, for example, gratings of the grating array 200 can be slit gratings (in this case, the grating hereinbefore refers to the slit of the slit grating) and can also be cylindrical lens gratings (in this case, the grating hereinbefore refers to the cylindrical lens in the cylindrical lens grating), as long as the grating of the grating array 200 can guide the light emitted from the backlight strip corresponding to the grating to the two preset viewpoints.

When the stereoscopic display component provided by the present invention is cooperatively used with a liquid crystal panel, the plurality of backlight strips in the groups of backlight strips are alternately lit up. For example, in FIG. 2, the backlight strip 111, the backlight strip 112, the backlight strip 113, the backlight strip 114, the backlight strip 115 and the backlight strip 116 of the backlight set 110 at the left side are lit up in sequence, correspondingly, the backlight strip 111, the backlight strip 112, the backlight strip 113, the backlight strip 114, the backlight strip 115 and the backlight strip 116 of the backlight set 110 at the right side are lit up in sequence. Moreover, the light emission timing of the corresponding backlight strips in every backlight sets is the same. Namely, in FIG. 2, when the backlight strip 111 of the backlight set 110 at the left side is lit up, the backlight strip 111 of the backlight set 110 at the right side is lit up as well.

The gratings in the grating array 200 can change the light path of the light emitted from the backlight board 100, when one backlight strip in the backlight set 110 is lit up, the propagation direction of the light emitted from the backlight strip is changed by a corresponding grating, and the light arrive at the preset viewpoints finally.

In the stereoscopic display component, the number of the backlight strips included in each backlight set should be the same as the number of the disparity images of the liquid crystal panel cooperatively used with the stereoscopic display component.

Usually, 4-6 disparity images can be set in the liquid crystal panel. Therefore, the number of the backlight strips included in each backlight set can also be 4-6. For example, in the embodiment provided by the present invention, 6 disparity images are set in the liquid crystal panel, thus each backlight set includes 6 backlight strips.

In the prior art, one disparity image is projected into the visual area of the left eye by the gratings, another disparity image is projected into the visual area of the right eye, an overlapped area exists between the visual area of the left eye and the visual area of the right eye, when the viewer views an image in the overlapped area, image crosstalk will be occurred to reduce the viewing effect and even cause such discomforts as dizziness of the viewer in severe cases.

To prevent the image crosstalk between the visual area of the left eye and the visual area of the right eye, for example, in the present invention, the grating can include a first polarization strip and a second polarization strip, which are arranged adjacently, and the polarization direction of the first polarization strip is vertical to the polarization direction of the second polarization strip. Only the light having the same polarization direction as the first polarization strip can penetrate through the first polarization strip, and only the light having the same polarization direction as the second polarization strip can penetrate through the second polarization strip. It should be understood that, when the grating of the grating array includes the first polarization strip and the second polarization strip, polarizer arrays arranged at the light emission side of the liquid crystal panel are needed for cooperative use. Herein, the grating array plays a role in polarization, and the polarizer arrays play a role in polarization analyser.

In the grating array, the first polarization strip is only adjacent to the second polarization strip (the second polarization strip can be located in the same grating as the first polarization strip and can also be located in a grating adjacent to the first polarization strip). The first polarization strip of one grating is adjacent to the second polarization strip of another grating. Therefore, the polarization direction of light passing through the first polarization strip of one grating is different from the polarization direction of the light passing through the second polarization strip of another grating. Due to the guide of the first polarization strip in one grating, only the light having the same polarization direction as the first polarization strip arrives at the polarizer array, and due to the guide of the second polarization strip in the another grating, only the light having the same polarization direction as the second polarization strip arrives at the polarizer array. A third polarization strip having the same polarization direction as the first polarization strip and a fourth polarization strip having the same polarization direction as the second polarization strip are arranged in the polarizer array, and only the light having the same polarization direction as the third polarization strip can pass through the third polarization strip, thus a part of light irradiated on the third polarization strip and having the polarization direction vertical to the polarization direction of the third polarization strip is blocked; similarly, only the light having the same polarization direction as the fourth polarization strip can pass through the fourth polarization strip, thus a part of light irradiated on the fourth polarization strip and having the polarization direction vertical to the polarization direction of the fourth polarization strip is blocked. Thus, compared with the prior art, the visual area of the left eye and the visual area of the right eye are narrowed, accordingly, the overlapped area of the visual area of the left eye and the visual area of the right eye is decreased or even disappears, such that the crosstalk between the images in the visual area of the left eye and the visual area of the right eye can be avoided.

The principle of decreasing the overlapped area of the visual area of the left eye and the visual area of the right eye will be explained below in conjunction with FIG. 3 and FIG. 6b.

As shown in FIG. 3, the first polarization strip (the first polarization strip 212a in FIG. 6b) of the grating 212 is adjacent to the second polarization strip 211b of the grating 211, and the second polarization strip (the second polarization strip 212b in FIG. 6b) of the grating 212 is adjacent to the first polarization strip 213a of the grating 213. As shown in FIG. 6b, in the polarizer array, the first polarization strip 212a of the grating 212 corresponds to the third polarization strip 312a of the polarizer 312 and the third polarization strip 313a of the polarizer 313, and in the polarizer array, the second polarization strip 212b of the grating 212 corresponds to the fourth polarization strip 312b of the polarizer 312 and the fourth polarization strip 313b of the polarizer 313.

Figure 6A:
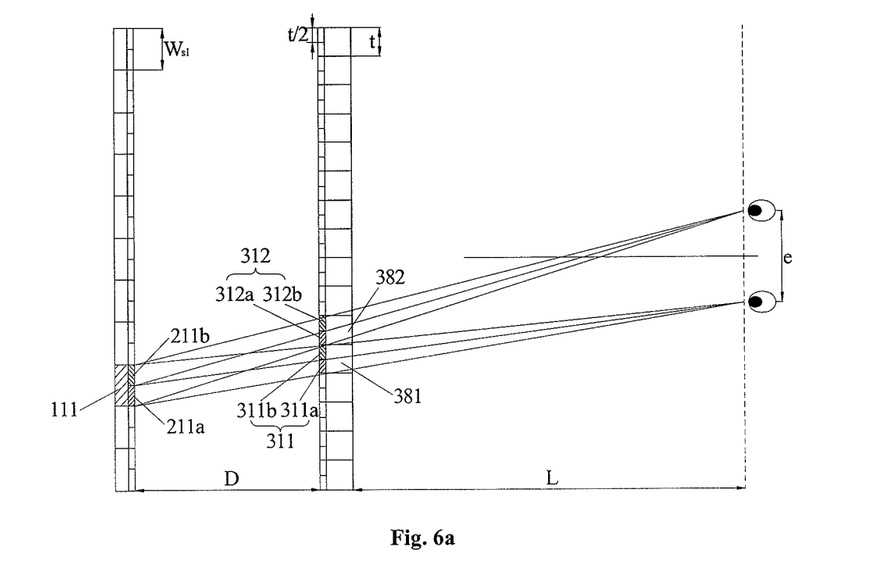
FIG. 6a to FIG. 6f are principle diagrams of a display device provided by the present invention for achieving full-resolution display.
Figure 6B:
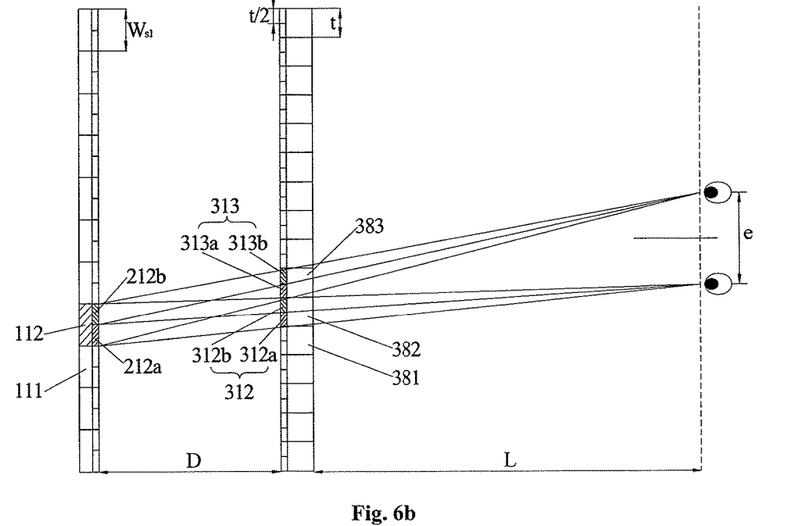

As shown in FIG. 6b, after passing through the grating 212, the light emitted from the backlight strip 112 corresponding to the grating 212 is divided into two paths of light, namely, the first path of light and the second path of light, and the two paths of light correspond to two visual areas. The two paths of light are guided by the first polarization strip 212a of the grating 212, and only the light having the same polarization direction as the first polarization strip 212a of the grating 212 arrives at the polarizer array; the light emitted from the backlight strip 112 corresponding to the grating 212 is guided by the second polarization strip 212b of the grating 212, and only the light having the same polarization direction as the second polarization strip 212b of the grating 212 arrives at the polarizer array. In the first path of light, only the light having the same polarization direction as the third polarization strip 312a of the polarizer 312 passes through the third polarization strip 312a, and only the light having the same polarization direction as the fourth polarization strip 312b of the polarizer 312 passes through the fourth polarization strip 312b; in the second path of light, only the light having the same polarization direction as the third polarization strip 313a of the polarizer 313 passes through the third polarization strip 313a, and only the light having the same polarization direction as the fourth polarization strip 313b of the polarizer 313 passes through the fourth polarization strip 312b. In other words, only a part of light emitted from the backlight strip 112 passes through the grating and the polarizer array, thus the respective ranges of the visual area of the left eye and the visual area of the right eye are decreased, as a result, the overlapped area between the visual area of the left eye and the visual area of the right eye is decreased and even eliminated.

Figure 4:
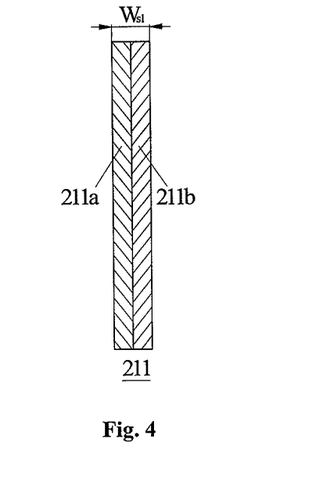
FIG. 4 is a schematic diagram of a grating in the grating array as shown in FIG. 3.

As shown in FIG. 4, the grating 211 includes a first polarization strip 211a and a second polarization strip 211b.

For example, the width $W_{s1}$ of each grating can be calculated by the following formula (1):

$$W_{s1} = \frac{et}{2(e-t)} \qquad (1)$$

wherein e refers to the distance between two eyes and is generally 50-75 mm;

t refers to the pixel pitch of the liquid crystal panel adopting the stereoscopic display component.

Those skilled in the art should understand that, the pixel is generally a square, and the side length of the square is the pixel pitch of the pixel.

The width $W_{s1}$ of one grating is the sum of the widths of the first polarization strip and the second polarization strip. Specifically, as shown in FIG. 4, the width $W_{s1}$ of the grating 211 is the sum of the widths of the first polarization strip 211a of the grating 211 and the second polarization strip 211b of the grating 211.

For example, the grating can be securely provided on the backlight board, and the width b of each backlight strip is equal to the width $W_{s1}$ of each grating.

When the width of the grating, the distance between the human eyes and the pixel pitch of the liquid crystal panel meet the above-mentioned formula (1), at the optimal viewing positions, the visual area of the left eye and the visual area of the right eye are not overlapped, namely, at the optimal viewing positions, no crosstalk of the left and right eye signals is generated.

As shown in FIG. 7, when the backlight strip 113 in the backlight set emits light, 6 different optimal viewpoints can be formed in the space, and a disparity image can be seen in the visual area corresponding to each optimal viewpoint. It can be seen from the figure that, the overlapped area of the visual areas is relatively small.

To ensure that the images and residues of a plurality of disparity images in the brain can be overlapped to form a full-resolution visual effect, for example, the light emission frequency f of each backlight strip meets the following formula (2):

$$f=(50\text{-}70)\times N \text{ Hz} \qquad (2)$$

wherein N refers to the number of the backlight strips included in each backlight set.

It can be further seen that, the light emission frequency of each backlight set is 50-70 Hz. The light emission frequency of each backlight set is the same as the display frequency of the liquid crystal panel, in general, the display frequency of the liquid crystal panel is 60 Hz, in the specific embodiment in which each backlight set includes 6 backlight strips, the light emission frequency of each backlight strip is 360 Hz.

Figure 5:
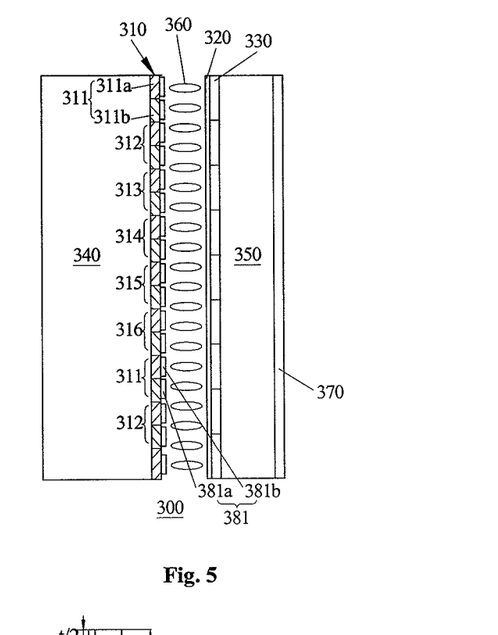
FIG. 5 is a schematic diagram of a liquid crystal panel provided by the present invention.

As another aspect of the present invention, as shown in FIG. 1 and FIG. 5, a liquid crystal panel 300 is provided, and the liquid crystal panel 300 includes a plurality of columns of pixel groups used for forming a plurality of disparity images, each column of pixel groups includes a plurality of columns of pixels, each column of pixels includes a plurality of pixels, wherein the plurality of columns of pixel groups are in one-to-one correspondence with the plurality of backlight sets 110 of the above-mentioned stereoscopic display component as shown in FIG. 2, and in each column of pixel groups, the plurality of columns of pixels are in one-to-one correspondence with the plurality of backlight strips in a corresponding backlight set, and the number of columns of pixels in each column of pixel groups is the same as the number of the plurality of disparity images.

As mentioned above, when one backlight strip in the stereoscopic display component emits light, the drive circuit provides drive signals to a column of pixels corresponding to the backlight strip emitting light in the liquid crystal panel, for enabling the liquid crystal panel to display an image. Due to the guide of the grating array, the displayed disparity image can be seen at the preset viewpoints.

As shown in FIG. 5, being the same as the existing liquid crystal panel, the liquid crystal panel provided by the present invention includes an array substrate 340, a cell alignment substrate 350 and a liquid crystal layer 360 arranged between the array substrate 340 and the cell alignment substrate 350. An optical filter 330 and an analyser 370 can also be arranged on the cell alignment substrate 350, and the liquid crystal panel further includes a common electrode 320 corresponding to the pixel electrode of the pixel.

As shown in FIG. 3 to FIG. 5, when the grating (e.g., including 211, 212, 213, 214, 215 and 216) of the stereoscopic display component includes the first polarization strip (e.g., including 211a, 212a, 213a, 214a, 215a and 216a) and the second polarization strip (e.g., including 211b, 212b, 213b, 214b, 215b and 216b), the liquid crystal panel may further include a polarizer array 310 arranged on the array substrate 340. The polarizer array 310 includes a plurality of polarizers (in the embodiment as shown in FIG. 5, the polarizers 311, 312, 313, 314, 315 and 316 are shown), each polarizer includes a third polarization strip and a fourth polarization strip, which are arranged adjacently (e.g., in the embodiment as shown in FIG. 5, the polarizer 311 includes the third polarization strip 311a of the polarizer and the fourth polarization strip 311b of the polarizer), and the polarization direction of the third polarization strip 311a is vertical to the polarization direction of the fourth polarization strip 311b. The number of the polarizers in the polarizer array 310 is the same as the number of the columns of the pixels, and moreover, the polarizers in the polarizer array 310 correspond to the gratings in the stereoscopic display device. For example, the third polarization strip 311a in the polarizer array 310 corresponds to the first polarization strip 211a, the polarization direction of the third polarization strip 311a is the same as the polarization direction of the first polarization strip 211a, the fourth polarization strip 311b corresponds to the second polarization strip 211b, and the polarization direction of the fourth polarization strip 311b is the same as the polarization direction of the second polarization strip 211b. As mentioned above, the grating array in the stereoscopic display device plays a role in polarization, and the polarizer array 310 plays a role in polarization analyser.

Since the polarization states of the light passing through the third polarization strip 311a are different from the polarization states of the light passing through the fourth polarization strip 311b, correspondingly, as shown in FIG. 5, the pixel electrode 381 of the pixel of the liquid crystal panel includes a first pixel electrode strip 381a and a second pixel electrode strip 381b, the first pixel electrode strip 381a corresponds to the third polarization strip 311a, and the second pixel electrode strip 381b corresponds to the fourth polarization strip 311b. The first pixel electrode strip 381a is used for controlling the deflection direction of liquid crystal molecules corresponding to the first pixel electrode strip 381a, for enabling the light passing through the third polarization strip 311a to be transmitted to the cell alignment substrate; the second pixel electrode strip 381b is used for controlling the deflection direction of liquid crystal molecules corresponding to the second pixel electrode strip 381b, for enabling the light to pass through the fourth polarization strip 311b to be transmitted to the cell alignment substrate. For example, in the embodiment as shown in FIG. 5, the pixel electrode 381 may include the first pixel electrode strip 381a and the second pixel electrode strip 381b. It can be easily understood that, two pixel electrode strips in one pixel (i.e., the first pixel electrode strip and the second pixel electrode strip) are independently controlled.

Correspondingly, the width $W_{s2}$ of each polarization strip may be calculated by the following formula (3):

$$W_{s2} = \frac{t}{2} \qquad (3)$$

wherein t refers to the pixel pitch of the liquid crystal panel.

As a third aspect of the present invention, as shown in FIG. 1, FIG. 6a to FIG. 6f and FIG. 7, a display device is provided, and the display device includes a stereoscopic display component, a liquid crystal panel 300 and a drive circuit (not shown). As shown in FIG. 1, the stereoscopic display component includes a backlight board 100 and a grating array 200, as shown in FIG. 2, the backlight board 100 includes a plurality of backlight sets 110, and each backlight set 110 includes a plurality of backlight strips capable of emitting light independently. As shown in FIG. 3, the grating array 200 includes a plurality of grating sets 210 in one-to-one correspondence with the plurality of backlight sets, each grating set 210 includes a plurality of gratings in one-to-one correspondence with the plurality of backlight strips in the corresponding backlight set, and each grating can be used for guiding the light emitted from the backlight strip corresponding to the grating to two preset viewpoints.

The liquid crystal panel includes a plurality of columns of pixel groups used for ing a plurality of disparity images, each column of pixel groups includes a plurality of columns of pixels, each column of pixels includes a plurality of pixels, wherein the plurality of columns of pixel groups are in one-to-one correspondence with the plurality of backlight sets of the stereoscopic display component, and in each column of pixel groups, the plurality of columns of pixels are in one-to-one correspondence with the plurality of backlight strips in a corresponding backlight set, and the number of the columns of the pixels in each column of pixel groups is the same as the number of the plurality of disparity images.

The drive circuit is electrically connected with the liquid crystal panel, and when a backlight strip in a backlight set emits light, the drive circuit provides drive signals to a corresponding column of pixels.

Due to the guide of the gratings in the grating array, the light emitted from the backlight strips in the backlight board may arrive at preset viewpoints, so that preset disparity images can be seen at the preset viewpoints. Since the backlight strips in the backlight board are alternately lit up (i.e., alternately emitting light), the columns of pixels corresponding to the backlight strips in the display panel alternately receive the drive signals. Since in each column of pixel groups, different columns of pixels respectively correspond to different disparity images, a plurality of different disparity images can be seen in sequence at the preset viewpoints. When the time interval of the plurality of different disparity images is smaller than the time delay of human eyes, the plurality of disparity images are overlapped in the brain of the viewer, so as to reduce the resolution loss. As shown in FIG. 6a to FIG. 6f, at the two preset viewpoints, 6 different disparity images can be seen, in the brain of the viewer, the 6 disparity images are mutually overlapped, thus reducing the resolution loss of the image seen by the viewer.

In the present invention, the device for providing light emission signals to the backlight strips of the backlight board is not specifically limited. For example, a circuit structure periodically providing high and low levels can be used for providing the light emission signals to the backlight board. To reduce the volume of the display device, for example, the drive circuit can be used for providing the light emission signals to the backlight strips of the backlight board. That is, the drive circuit is electrically connected with the backlight board to provide the light emission signals to the plurality of backlight strips of the backlight board, and the light emission signals to the plurality of backlight strips are synchronized with the drive signals of the plurality of columns of pixels in one-to-one correspondence with the plurality of backlight strips.

In the present invention, the position relationship of the liquid crystal panel and the grating array can be determined according to the specific structure of the grating array. For example, when the grating is a slit grating, the grating array can be arranged between the liquid crystal panel and the backlight board; when the grating is a cylindrical lens grating, the grating array can be arranged at the light emission side of the liquid crystal panel.

As a preferable embodiment of the present invention, the grating may include a first polarization strip and a second polarization strip, which are arranged adjacently, the polarization direction of the first polarization strip is vertical to the polarization direction of the second polarization strip, the grating array is arranged between the liquid crystal panel and the backlight board, the liquid crystal panel includes an array substrate, a polarizer array arranged on the array substrate, a cell alignment substrate and a liquid crystal layer arranged between the array substrate and the cell alignment substrate, the polarizer array includes a plurality of polarizers, each polarizer includes a third polarization strip and a fourth polarization strip, which are arranged adjacently, the polarization direction of the third polarization strip is vertical to the polarization direction of the fourth polarization strip, the polarization direction of the first polarization strip is the same as the polarization direction of the third polarization strip, and the polarization direction of the second polarization strip is the same as the polarization direction of the fourth polarization strip.

As mentioned above, the grating of the grating array is arranged to include the first polarization strip and the second polarization strip, which are arranged adjacently, such that the range of each visual area is narrowed, and the overlapped area between the visual area of the left eye and the visual area of the right eye is decreased (even eliminated), thus further reducing the crosstalk phenomenon of the left eye image and the right eye image to improve the visual enjoyment of the viewer.

As mentioned above, the width $W_{s1}$ of each grating may be calculated by formula (1), and the width of each polarization strip may be calculated by formula (3). When the width of each grating is calculated by formula (1), at the preset optimal viewing distance, the visual area of the left eye and the visual area of the right eye are not overlapped.

The distance between the grating array and the polarizer array may be calculated by the following formula (4):

$$D = \frac{Lt}{e-t} \qquad (4)$$

wherein L refers to the preset optimal viewing distance, and in general, the length of L is 2-3 times as large as the length of the diagonal line of the liquid crystal panel;

e refers to the distance between the two eyes of the viewer and is generally 50-75 mm;

t refers to the pixel pitch of the liquid crystal panel.

As a preferable embodiment, the preset optimal viewing distance L may be 2.5 times as large as the length of the diagonal line of the liquid crystal panel. When the length of the diagonal line of the liquid crystal panel is 46 inches, the preset optimal viewing distance L is 115 inches, namely, the distance between the eyes of the viewer and the display surface of the liquid crystal panel can be 115 inches.

Since the display device provided by the present invention includes the above-mentioned stereoscopic display component provided by the present invention, the specific structures of the backlight set and the grating array in the display device are the same as the above descriptions, and will not be repeated herein. The display device in the embodiment may be any product or part with a display function, such as a liquid crystal panel, a liquid crystal TV, a liquid crystal display, a digital photo frame, a mobile phone, a tablet computer and the like.

It should be noted that, the frequency at which the drive circuit provides the drive signals to each column of pixels of each column of pixel groups is consistent with the light emission frequency of the corresponding backlight strip in the corresponding backlight set.

The working principle of the preferable embodiment of the display device provided by the present invention will be described below in detail in combination with FIG. 6a to FIG. 6f.

In FIG. 6a, the backlight strip 111 emits light and the rest backlight strips do not emit light. The drive circuit provides the drive signals to the pixel 381 and the pixel 382. The propagation route of the light emitted from the backlight strip 111 is changed by a corresponding grating (in FIG. 6a, it is the grating formed by the first polarization strip 211a and the second polarization strip 211b) to be divided into two paths of light, one of which passes through a polarizer 311 (including a third polarization strip 311a having the same polarization direction as the first polarization strip 211a and a fourth polarization strip 311b having the same polarization direction as the second polarization strip 211b) and the pixel 381 corresponding to the polarizer 311 to arrive at the left eye viewpoint, and the other of which passes through a polarizer 312 (including a third polarization strip 312a having the same polarization direction as the first polarization strip 211a and a fourth polarization strip 312b having the same polarization direction as the second polarization strip 211b) and the pixel 382 to arrive at the right eye viewpoint. The pixel 381 corresponds to the first disparity image and enters the left eye of the viewer, and the pixel 382 corresponds to the second disparity image and enters the right eye of the viewer.

In FIG. 6b, the backlight strip 112 emits light and the rest backlight strips do not emit light. The drive circuit provides the drive signals to the pixel 382 and the pixel 383. The propagation route of the light emitted from the backlight strip 112 is changed by a corresponding grating (in FIG. 6b, it is the grating formed by the first polarization strip 212a and the second polarization strip 212b) to be divided into two paths of light, one of which passes through a polarizer 312 (including a third polarization strip 312a having the same polarization direction as the first polarization strip 212a and a fourth polarization strip 312b having the same polarization direction as the second polarization strip 212b) and the pixel 382 corresponding to the polarizer 312 to arrive at the left eye viewpoint, and the other of which passes through a polarizer 313 (including a third polarization strip 313a having the same polarization direction as the first polarization strip 212a and a fourth polarization strip 313b having the same polarization direction as the second polarization strip 212b) and the pixel 383 corresponding to the polarizer 312 to arrive at the right eye viewpoint. The pixel 382 corresponds to the second disparity image and enters the left eye of the viewer, and the pixel 383 corresponds to the third disparity image and enters the right eye of the viewer.

Figure 6C:
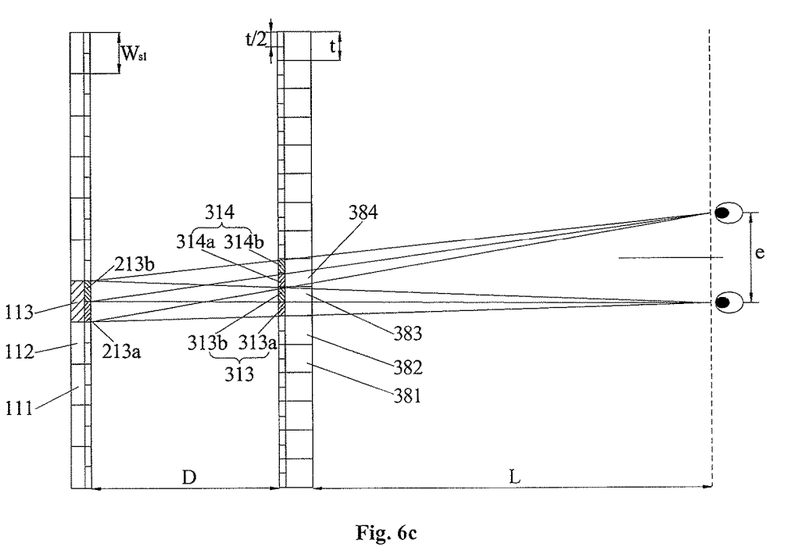

In FIG. 6c, the backlight strip 113 emits light and the rest backlight strips do not emit light. The drive circuit provides the drive signals to the pixel 383 and the pixel 384. The propagation route of the light emitted from the backlight strip 113 is changed by a corresponding grating (in FIG. 6c, it is the grating formed by the first polarization strip 213a and the second polarization strip 213b) to be divided into two paths of light, one of which passes through a polarizer 313 (including a third polarization strip 313a having the same polarization direction as the first polarization strip 213a and a fourth polarization strip 313b having the same polarization direction as the second polarization strip 213b) and the pixel 383 to arrive at the left eye viewpoint, and the other of which passes through a polarizer 314 (including a third polarization strip 314a having the same polarization direction as the first polarization strip 213a and a fourth polarization strip 314b having the same polarization direction as the second polarization strip 213b) and the pixel 384 to arrive at the right eye viewpoint. The pixel 383 corresponds to the third disparity image and enters the left eye of the viewer, and the pixel 384 corresponds to the fourth disparity image and enters the right eye of the viewer.

Figure 6D:
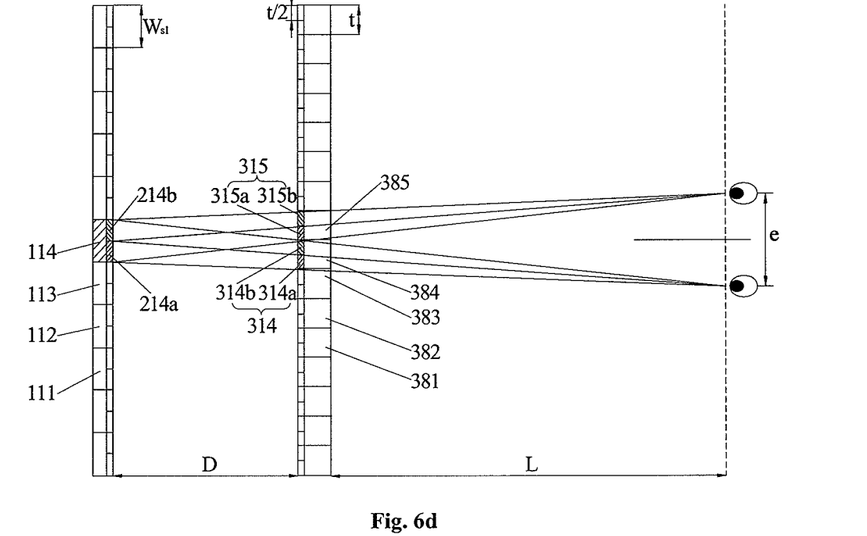

In FIG. 6d, the backlight strip 114 emits light and the rest backlight strips do not emit light. The drive circuit provides the drive signals to the pixel 384 and the pixel 385. The propagation route of the light emitted by the backlight strip 114 is changed by a corresponding grating (in FIG. 6d, it is the grating formed by the first polarization strip 214a and the second polarization strip 214b) to be divided into two paths of light, one of which passes through a polarizer 314 (including a third polarization strip 314a having the same polarization direction as the first polarization strip 214a and a fourth polarization strip 314b having the same polarization direction as the second polarization strip 214b) and the pixel 384 to arrive at the left eye viewpoint, and the other of which passes through a polarizer 315 (including a third polarization strip 315a having the same polarization direction as the first polarization strip 214a and a fourth polarization strip 315b having the same polarization direction as the second polarization strip 214b) and the pixel 385 to arrive at the right eye viewpoint. The pixel 384 corresponds to the fourth disparity image and enters the left eye of the viewer, and the pixel 385 corresponds to the fifth disparity image and enters the right eye of the viewer.

Figure 6E:
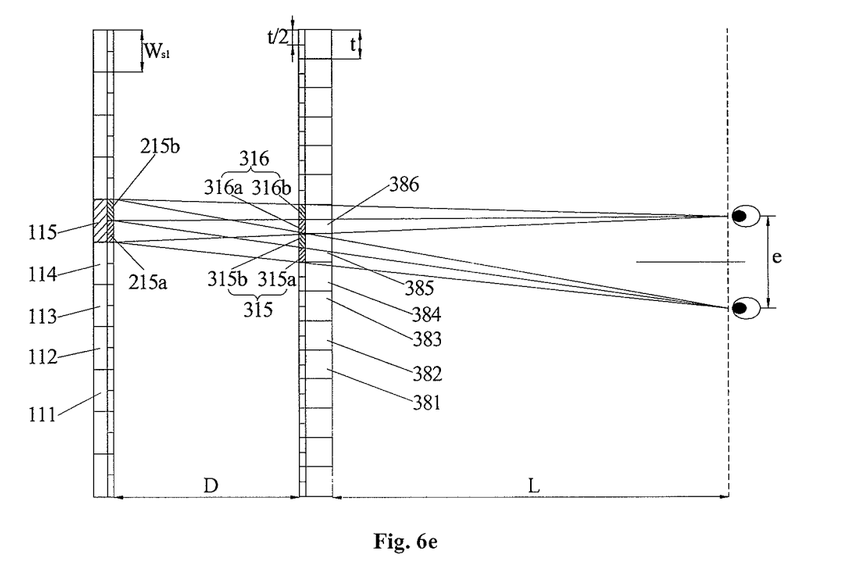

In FIG. 6e, the backlight strip 115 emits light and the rest backlight strips do not emit light. The drive circuit provides the drive signals to the pixel 385 and the pixel 386. The propagation route of the light emitted from the backlight strip 115 is changed by a corresponding grating (in FIG. 6e, it is the grating formed by the first polarization strip 215a and the second polarization strip 215b) to be divided into two paths of light, one of which passes through a polarizer 315 (including a third polarization strip 315a having the same polarization direction as the first polarization strip 215a and a fourth polarization strip 315b having the same polarization direction as the second polarization strip 215b) and the pixel 385 to arrive at the left eye viewpoint, and the other of which passes through a polarizer 316 (including a third polarization strip 316a having the same polarization direction as the first polarization strip 215a and a fourth polarization strip 316b having the same polarization direction as the second polarization strip 215*b*) and the pixel 386 to arrive at the right eye viewpoint. The pixel 385 corresponds to the fifth disparity image and enters the left eye of the viewer, and the pixel 386 corresponds to the sixth disparity image and enters the right eye of the viewer.

Figure 6F:
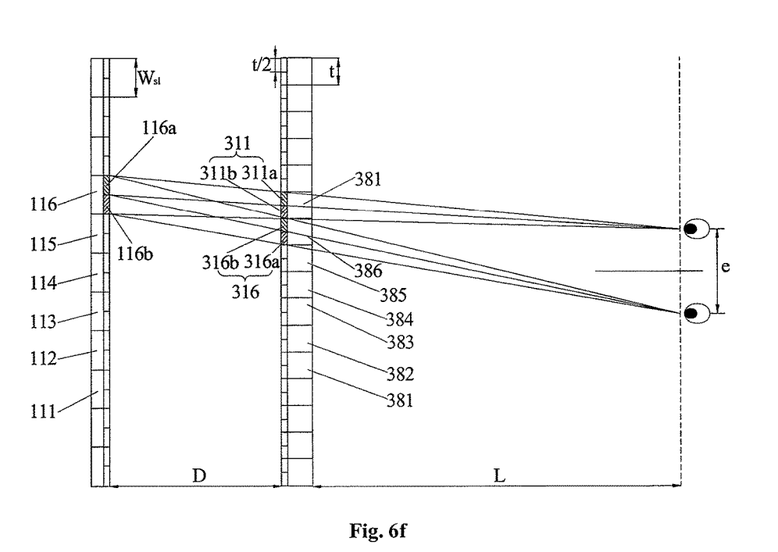

In FIG. 6*f*, the backlight strip 116 emits light and the rest backlight strips do not emit light. The drive circuit provides the drive signals to the pixel 381 and the pixel 386. The propagation route of the light emitted from the backlight strip 116 is changed by a corresponding grating (in FIG. 6*f*, it is the grating formed by the first polarization strip 216*a* and the second polarization strip 216*b*) to be divided into two paths of light, one of which passes through a polarizer 316 (including a third polarization strip 316*a* having the same polarization direction as the first polarization strip 216*a* and a fourth polarization strip 316*b* having the same polarization direction as the second polarization strip 216*b*) and the pixel 386 to arrive at the left eye viewpoint, and the other of which passes through a polarizer 311 (including a third polarization strip 311*a* having the same polarization direction as the first polarization strip 216*a* and a fourth polarization strip 311*b* having the same polarization direction as the second polarization strip 216*b*) and the pixel 381 to arrive at the right eye viewpoint. The pixel 386 corresponds to the sixth disparity image and enters the left eye of the viewer, and the pixel 381 corresponds to the first disparity image and enters the right eye of the viewer.

Within one period of the backlight set, the left eye and the right eye can see 6 disparity images. If the alternating speed of two disparity images is fast, when the latter disparity image is displayed, the influence of the former disparity image is still left in the human brain, so an overlapped effect of the first disparity image and the second disparity image may be generated in the human brain, such that the resolution of the image capable of being seen by human eyes is improved. If the alternating speed of a plurality of disparity images is fast, the residual images of the plurality of disparity images are overlapped in the human brain to achieve full-resolution display. Moreover, since the ranges of the visual areas corresponding to the viewpoints are small, the overlapped area generated between two adjacent visual areas is small, so the crosstalk phenomenon of the images of the adjacent visual areas can be decreased to enable the viewer to obtain a better viewing effect.

It can be understood that, the foregoing embodiments are merely exemplary embodiments used for illustrating the principle of the present invention, but the present invention is not limited hereto. To those of ordinary skill in the art, various variations and improvements could be made without departing from the spirit and essence of the present invention, and these variations and improvements are also contemplated as falling within the protection scope of the present invention.

The invention claimed is:

1. A display device, comprising a stereoscopic display component, a liquid crystal panel and a drive circuit, wherein the stereoscopic display component comprises a backlight board and a grating array, wherein the backlight board comprises a plurality of backlight sets, each backlight set comprising a plurality of backlight strips capable of emitting light independently, the grating array comprises a plurality of grating sets in one-to-one correspondence with the plurality of backlight sets, each grating set comprising a plurality of gratings in one-to-one correspondence with the plurality of backlight strips in a corresponding backlight set, wherein each grating comprises a first polarization strip and a second polarization strip, which are arranged adjacently, and a polarization direction of the first polarization strip is vertical to a polarization direction of the second polarization strip such that light emitted from a backlight strip corresponding to the respective grating is guided to two preset viewpoint, the liquid crystal panel comprising a plurality of columns of pixel groups used for forming a plurality of disparity images, each column of pixel groups comprising a plurality of columns of pixels, each column of pixels comprising a plurality of pixels, and the number of columns of the pixels in each column of pixel groups being equal to the number of the plurality of disparity images, wherein the plurality of columns of pixel groups are in one-to-one correspondence with the plurality of backlight sets of the stereoscopic display component, and in each column of pixel groups, the plurality of columns of pixels are in one-to-one correspondence with the plurality of backlight strips in a corresponding backlight set, the drive circuit is electrically connected to the liquid crystal panel, and when a backlight strip in a backlight set emits light, the drive circuit provides drive signals to a corresponding column of pixels wherein the liquid crystal panel comprises an array substrate, a polarizer array arrange on the array substrate, a cell alignment substrate and a liquid crystal layer arranged between the array substrate and the cell alignment substrate; and the polarizer array comprises a plurality of polarizers, each polarizer comprises a third polarization strip and a fourth polarization strip, which are arranged adjacently, a polarization direction of the third polarization strip is vertical to a polarization direction of the fourth polarization strip, the polarization direction of the first polarization strip is the same as the polarization direction of the third polarization strip, and the polarization direction of the second polarization strip is the same as the polarization direction of the fourth polarization strip.

2. The display device of claim 1, wherein the width of each grating meets the following condition:

$$W_{s1} = \frac{et}{2(e-t)},$$

wherein $W_{s1}$ refers to the width of each grating, e refers to the distance between two eyes and is 50-75 mm, and t refers to a pixel pitch of the liquid crystal panel;

the width of each polarization strip of each polarizer meets the following condition:

$$W_{s2} = \frac{t}{2},$$

wherein $W_{s2}$ refers to the width of each polarization strip.

3. The display device of claim 2, wherein the distance between the grating array and the polarizer array is:

$$D = \frac{Lt}{e-t},$$

wherein D refers to the distance between the grating array and the polarizer array, and L refers to a preset optimal viewing distance.

4. The display device of claim 1, wherein the number of the backlight strips contained in each backlight set is the same as the number of the plurality of disparity images obtained by dividing an image to be displayed stereoscopically.

5. The display device of claim 4, wherein the number of the backlight strips contained in each backlight set is 4-6.

6. The display device of claim 5, wherein the light emission frequency of each backlight strip is 50×N Hz to 70×N Hz, N refers to the number of the backlight strips contained in each backlight set, and the frequency at which the drive circuit provides the drive signals to each column of pixels of each column of pixel groups is consistent with the light emission frequency of the corresponding backlight strip in the corresponding backlight set.

7. The display device of claim 6, wherein the drive circuit is electrically connected to the backlight board to provide light emission signals to the plurality of backlight strips of the backlight board, and the light emission signals to the plurality of backlight strips are synchronized with the drive signals of a plurality of columns of pixels in one-to-one correspondence with the plurality of backlight strips.

8. The display device of claim 1, wherein each grating is a slit grating, and the grating array is arranged between the liquid crystal panel and the backlight board.

9. The display device of claim 1, wherein each grating is a cylindrical lens grating, and the grating array is arranged at the light outgoing side of the liquid crystal panel.

* * * * *